United States Patent
Khan

Patent Number: 5,568,332
Date of Patent: Oct. 22, 1996

[54] MAGNETIC HEAD SUSPENSION

[75] Inventor: Amanullah Khan, Pleasanton, Calif.

[73] Assignee: Read-Rite Corporation, Milpitas, Calif.

[21] Appl. No.: 418,451

[22] Filed: Dec. 22, 1994

Related U.S. Application Data

[63] Continuation of Ser. No. 161,168, Dec. 3, 1993, abandoned.

[51] Int. Cl.$^6$ ............................. G11B 21/21; G11B 5/60
[52] U.S. Cl. ............................................................. 360/104
[58] Field of Search .................................... 360/104, 105, 360/102, 103, 107

[56] References Cited

U.S. PATENT DOCUMENTS

| | | | |
|---|---|---|---|
| 4,786,999 | 11/1988 | Tanaka et al. | 360/104 |
| 4,792,875 | 12/1988 | Ohdaira | 360/104 |
| 4,992,898 | 2/1991 | Wanlass | 360/104 |
| 5,008,768 | 4/1991 | Carlson et al. | 360/104 |
| 5,079,660 | 1/1992 | Yumura et al. | 360/104 |
| 5,225,950 | 7/1993 | Crane | 360/104 |
| 5,353,181 | 10/1994 | Frater et al. | 360/103 |
| 5,452,158 | 9/1995 | Harrison et al. | 360/104 |
| 5,455,727 | 10/1995 | Baral et al. | 360/104 |

FOREIGN PATENT DOCUMENTS

| | | | |
|---|---|---|---|
| 155746 | 9/1985 | European Pat. Off. | 360/104 |
| 2-18770 | 1/1990 | Japan | 360/104 |
| 3-80480 | 4/1991 | Japan | 360/104 |

*Primary Examiner*—Robert S. Tupper
*Assistant Examiner*—David L. Ometz
*Attorney, Agent, or Firm*—Nathan N. Kallman

[57] ABSTRACT

A magnetic head suspension assembly is fabricated with a flexure that is formed with a U-shaped finger surrounded by a cutout at the front end of the flexure. A load dimple is provided on the flexure. The flexure supports an air bearing slider that pitches and rolls relative to a disk surface and is subject to lateral displacement during operation in a disk drive. The flexure is formed with primary stabilizer sections and secondary stabilizer arms which reduce pitch and roll stiffnesses while increasing lateral stiffness, thereby maintaining a substantially constant slider flying height.

9 Claims, 2 Drawing Sheets

MAGNETIC HEAD SUSPENSION

CROSS-REFERENCE TO PATENT APPLICATION

This application is a continuation of patent application Ser. No. 08/161,168, filed Dec. 3, 1993 now abandoned. U.S. patent application Ser. No. 07/926,033 filed Aug. 5, 1993, now U.S. Pat. No. 5,299,081 issued Mar. 29, 1994, and assigned to the same assignee, discloses a magnetic head suspension assembly which incorporates, inter alia, a load beam and a flexure that supports a slider. The subject matter of the patent is incorporated herein by reference. The present invention is directed to a modification of the head suspension assembly for reducing flying height variations by reducing pitch and roll stiffnesses and increasing lateral stiffness.

FIELD OF THE INVENTION

This invention relates to an improved magnetic head suspension assembly and in particular to a modified flexure design for reducing flying height variations and for providing better static attitude control (flatness).

DESCRIPTION OF THE PRIOR ART

Presently known disk drives, such as used in laptop or notebook computers, include at least one rotatable magnetic disk, at least one magnetic head assembly for transducing data recorded on the disk, and a rotary head actuator for transporting the magnetic head to selected data tracks on the rotating disk. The magnetic head assembly comprises a head suspension fabricated with a rigid load beam element and a spring-loaded flexure. An air bearing slider is mounted at the end of the flexure and supports a thin film magnetic transducer which coacts with the magnetic disk for recording or reading data. When assembling the flexure to the slider, it is necessary to position a load dimple formed on the flexure at a predetermined point relative to the top surface of the slider in order to achieve proper gimballing action of the suspension.

During operation of the disk drive, the rotating magnetic disk provides an aerodynamic lift force through forming a boundary layer to the slider, while an opposing gram load force is applied to the slider through the flexure and load beam. The resultant of the two opposing forces determines the flying height of the slider and its transducer relative to the disk surface. In its operating flying mode, the slider gimbals about a load dimple formed in the flexure. The motion of the slider is subject to pitch and roll, while the flexure encounters oscillations in a vertical direction perpendicular to the plane of an associated rotating disk, and also experiences bending forces as well as swing and sway in a lateral direction. These movements of the flexure and slider adversely affect the desired constancy of the flying height unless controlled and minimized. By controlling these motion characteristics of the flexure, the slider can be made to follow closely the variations in topography of the associated rotating disk surface.

A major objective in the design of flexures used in head suspension assemblies is to reduce flying height variations by controlling and reducing pitch and roll stiffnesses while increasing lateral stiffness. The flexure and attached slider are subject to oscillation and vibration, particularly at high resonant frequencies, and also are subject to bending and twisting forces and sway or lateral displacement. During the startup of a disk drive and during the seek mode, when the head accesses the data tracks and is moved radially between selected data tracks, the flexure may experience undue vibration at a resonant frequency. Also, if the head assembly is suddenly stopped at a crash stop, which is typically located near the radial ends of the data tracks, the unit may undergo track failure or other mechanical disturbance so that the flexure and its slider will experience shock and oscillate, particularly at a high resonant frequency. In addition, excessive bending of the flexure during disk drive operation can cause fatigue of the flexure metal body and may result in breakage at high amplitude oscillations. A desired objective of flexure design is to increase all the resonance frequencies to reduce the amplitude of the oscillations.

SUMMARY OF THE INVENTION

An object of this invention is to provide a head suspension assembly wherein flying height variations of an air bearing slider are effectively reduced.

Another object of this invention is to provide a head suspension assembly with reduced pitch and roll stiffnesses and increased lateral stiffness.

Another object is to provide a head suspension assembly including a flexure and slider which experience a reduction in vertical motion and oscillations when flying over a rotating disk.

A further object is to provide a head suspension assembly wherein the flexure and slider experience a significant reduction in swing or sway during disk drive operation.

According to this invention, a head suspension assembly incorporates a flexure which is formed with a finger bounded by a U-shaped cutout. The flexure has a load dimple formed on the finger about which an air bearing slider can pitch and roll in a gimbal action relative to the surface of a rotating disk. The flexure is configured with primary stabilizer sections and secondary stabilizer arms that are separated by elongated slots. The stabilizer sections and arms act to reduce pitch and roll stiffnesses while increasing lateral stiffness. As a result, the flying height of the slider is maintained substantially constant during transducing of the data registered on a surface of a rotating magnetic disk.

The invention disclosed herein is particularly applicable to magnetic head suspension assemblies incorporating nanosliders, which are about 0.080 inch long, 0.063 inch wide and 0.017 inch in height, but is not limited to such a particular application.

BRIEF DESCRIPTION OF THE DRAWINGS

The invention will be described in greater detail with reference to the drawing in which.

DETAILED DESCRIPTION OF THE INVENTION

Figure 1:
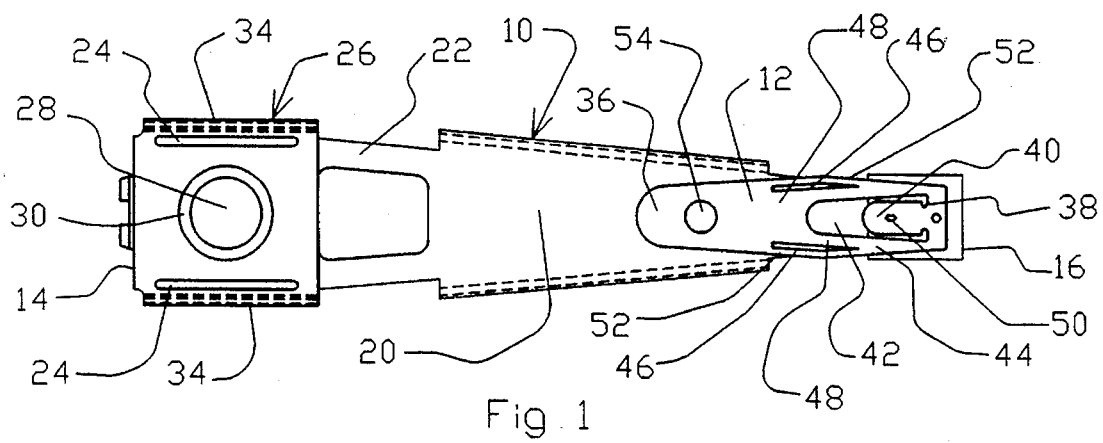
FIG. 1 is a top plan view of a head suspension assembly comprising a load beam and a the novel flexure of this invention.
Figure 2:
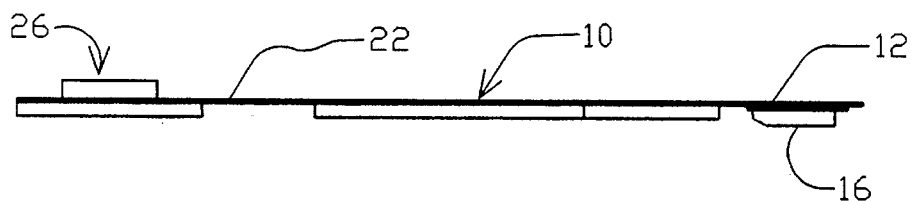
FIG. 2 is a side elevation view of the head suspension assembly shown in FIG. 1.
Figure 3:
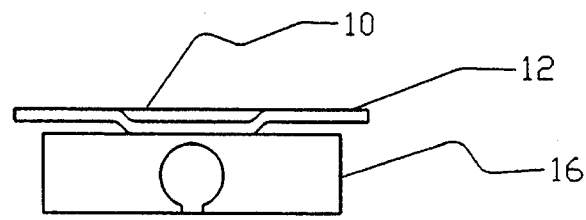
FIG. 3 is an enlarged front end view of the head suspension of FIG. 1.
Figure 7:
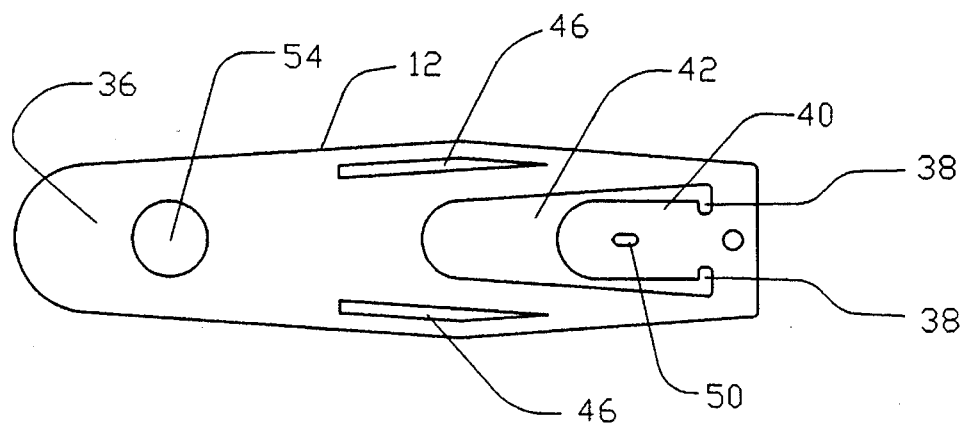
FIG. 7 is an enlarged plan view of the flexure shown in FIG. 1. Similar numerals refer to similar elements in the drawing. It should be understood that the sizes of the different components in the Figures may not be in exact proportion, and are shown for visual clarity and for the purpose of explanation.

FIGS. 1–3 illustrate a head suspension assembly that is fabricated with a load beam 10, a flexure 12, a swage plate 14 and an air bearing slider 16. A thin film transducer (not shown) having a transducing gap is deposited at the end of the slider 16, as is well known in the art. As illustrated in FIG. 1, the head suspension assembly is fabricated with a central triangular-type major section 20, a leaf spring or flexible section 22 and a rectangular rear mount section 26. A hole 28 is provided in the rear section 26 of the load beam 10 to allow joinder by laser welding of the swage plate 14 to the load beam by a boss 30. The swage plate 14 provides stiffness to the rear section 26 of the load beam. Relief slots 24 are provided to reduce stresses caused by bent flanges 34 and to avoid kinking thus maintaining the flatness of the rear section 26. Aperture ears 38 facilitate the bending of the front portion of the flexure 12 which serves to strengthen the front end section of the flexure and to preclude distortion of the flexure body.

The flexure 12 is attached at the front end of the load beam 10, by welding for example. The flexure 12 is fabricated with an oval rear end 36 and a U-shaped finger 40 at the front end. The base of the U-shaped finger points towards the oval rear end 36 of the flexure. The finger 40 is defined by a surrounding horseshoe-shaped or U-shaped cutout 42 that is formed around the finger 40. Outrigger sections 44 are disposed between the cutout 42 and the perimeter or sides of the flexure. The outriggers 44 serve as stabilizer sections to achieve low roll stiffness during operation of a disk drive using the head suspension assembly.

By widening the middle portion of the flexure 12 and by narrowing the front end and its rear end 36, the external roll moment effect is effectively reduced. The modified flexure design is characterized by high resonance frequencies and the desired high lateral stiffness. The width of the flexure finger 40 is made relatively wide to improve the bond strength between the slider and the flexure. A wide flexure designs allows a flatter shape, i.e., a better planarity of the structure, in forming and fabricating the suspension. Roll stiffness is reduced by tapering the cutout section.

When the head suspension is loaded to a rotating disk in a disk drive, the flexure 12 allows the slider to follow the variations in topography of the rotating disk surface. A hemispherical load dimple 50 is stamped in the flexure finger 40. The height of the load dimple 50 is minimized to keep the Z-height (vertical height of the head suspension) as small as possible. However sufficient clearance space is provided between the load beam 10 and the slider 16 to allow free gimbaling of the slider as it pitches and rolls about the load dimple 50 without interference by the load beam.

In accordance with this invention, elongated slots 46 are formed in the outrigger sections 44 between the cutout 42 and perimeter of the flexure 12 to create inner primary stabilizer sections 48 and outer secondary stabilizer arms 52. The narrow longitudinal slots 46 are preferably triangular-type in shape having the triangle apex facing to the front end of the flexure and the triangle base facing to the rear end of the flexure. This triangular shape maintains uniform stresses in the structure.

A tooling hole 54 used for alignment purposes provides a reference point for locating the slots 46. Using the center of the circular tooling hole 54 as the reference point, the front of each of the slots 46 is located at approximately ⅔ of the distance from the reference point to the front end of the flexure 12, while the rear end of each slot is located at about ⅓ of the same distance from the reference point. The distance of the center of the tooling hole 54 to the center of the load dimple 50 is about 0.210 inch. The sides of the slots 46 facing the perimeter of the flexure substantially follow the path of the sides of the flexure so that a substantially constant width is provided for the secondary stabilizer arms 52. The secondary stabilizer arms in combination with the primary stabilizer sections 48 provide a significant improvement in lateral stiffness of the flexure.

Figure 4:
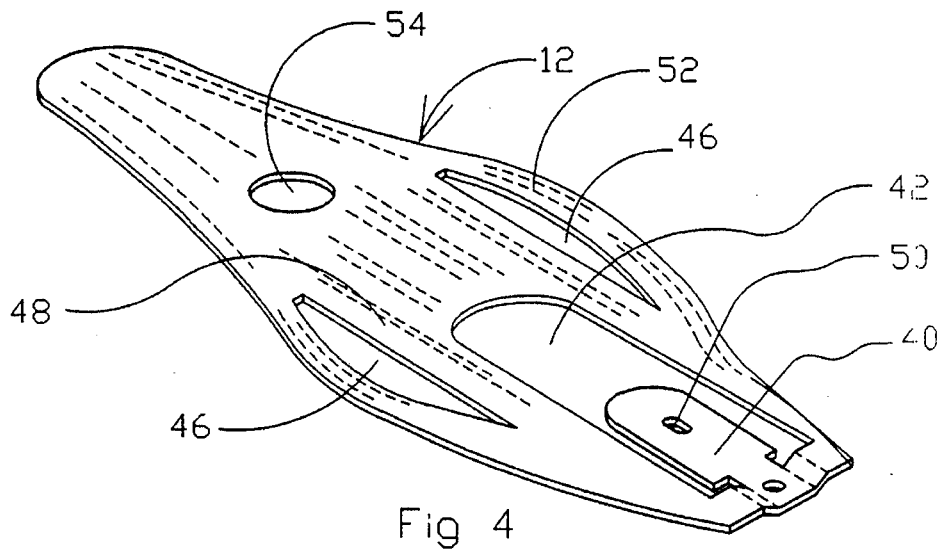
FIG. 4 is an isometric view illustrating a twisting mode of the flexure during operation in a disk drive.
Figure 5:
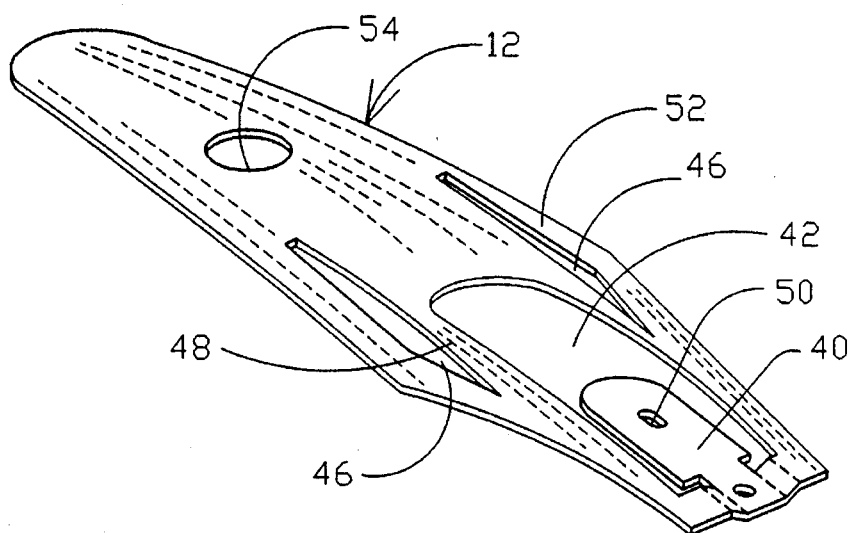
FIG. 5 is an isometric view illustrating a sway or swing mode of the novel flexure during operation in a disk drive.
Figure 6:
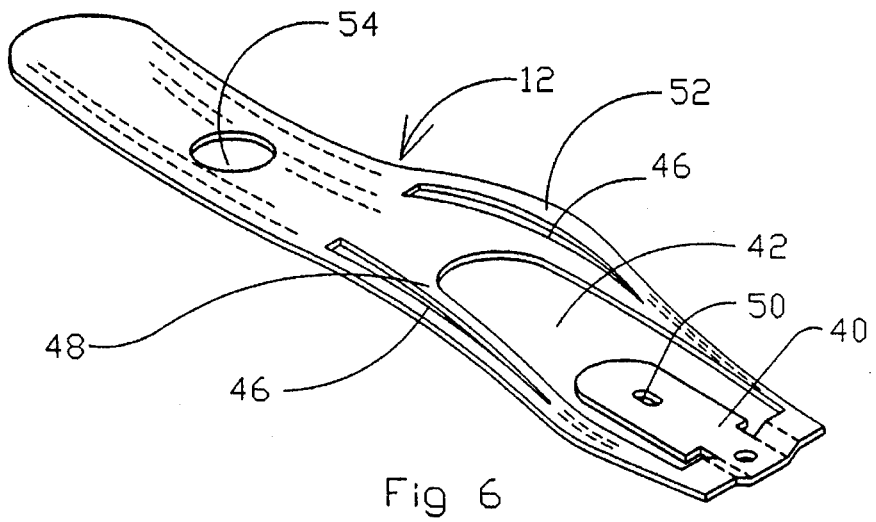
FIG. 6 is an isometric view illustrating a bending mode of the flexure during operation in a disk drive.

During operation in a disk drive, when the slider 16 is flying over an associated rotating disk, the slider generally experiences forces that produce twisting, swaying and bending. A twisting mode of the flexure is portrayed in FIG. 4. The secondary stabilizer arms 52 produce tension in one side of the flexure 12 while the other side of the flexure experiences compression, which causes a swing or sway of the flexure, as illustrated in FIG. 5. FIG. 6 illustrates the flexure being subjected to bending in a vertical direction, which is orthogonal to the surface of an associated rotating disk (not shown).

By virtue of the modified flexure configuration which incorporates primary stabilizer sections and secondary stabilizer arms separated by elongated slots, the head suspension assembly realizes a significant improvement in low pitch and roll stiffnesses, and an increased lateral stiffness so that slider flying height is maintained substantially constant during disk drive operation. Lateral stiffness is increased by the formation of the secondary stabilizer arms, which produces tension in one side of the flexure and compression in the other side.

In an actual implementation of the invention, a flexure which supports a nanoslider was made of type 304 stainless steel of about 0.0012 inch thick material having a maximum width of 0.080 inch, a front end of width of about 0.063 inch, a rear end width of about 0.060 inch and a length of about 0.025 inch. The flexure finger was formed with a depression or bend of about 0.002 to 0.003 inch relative to the plane of the flexure body. The width of each secondary stabilizer arm 52 was about 0.006 inch whereas the width of each primary stabilizer section 48 was about 0.008–0.010 inch. The length of each slot 46 was about 0.09 inch and the width of the base of each triangular-type slot was about 0.005 inch.

Using the modified flexure of this invention in a head suspension assembly as disclosed herein in a disk drive wherein the disk is rotating at about 4500 rpm (revolutions per minute), the roll and pitch stiffnesses were modeled at about 2.9 and 3.6 micronewton-meters respectively, whereas the lateral stiffness was modeled at about 12.97 micronewton-meters per degree of rotation. The sway mode is predicted to be greater than 7500 Hertz. With the modified flexure design, the motion of the flexure in the lateral and vertical directions was effectively reduced. It should be noted that with prior art head suspensions, pitch stiffness was less than roll stiffness, which makes the flexure more susceptible to distortion and to suffer mechanical damage.

What is claimed is:

1. A magnetic head suspension assembly for transducing data that is recorded and read out from a surface of a rotating magnetic disk drive comprising:

a load beam formed with a central major section;

a flexure joined to said load beam, said flexure having first and second opposing sides, a front end and a rear end, a middle portion of said flexure being wider between said first and second opposing sides than the flexure portions at said front end and said rear end;

a cutout formed at said front end of said flexure, said cutout having extended sides and a front end at said front end of said flexure;

a U-shaped finger projecting within said cutout between said extended cutout sides, said finger having a front end attached to said flexure and a rear end that is free and not attached;

first and second elongated nonrectangular narrow slots formed at said middle portion of said flexure, each of said slots having first and second slot sides respectively between said first and second opposing flexure sides and said extended cutout sides, each of said slots having a front end and a rear end, said front ends of said slots defining a line that does not intersect with said finger, said first and second narrow slots being the only slots located substantially within the wider middle portion of said flexure on each side of said cutout;

first and second inner primary stabilizer sections and first and second outer secondary stabilizer arms formed respectively on each side of said slots at the middle portion of said flexure, said inner stabilizer sections being adjacent to said cutout whereas said outer arms are adjacent to respective ones of said sides of said flexure;

an air bearing slider having leading and trailing ends joined to said flexure for free gimbaling motion while flying above an associated disk during operation in said disk drive;

whereby said slider is maintained at a substantially constant flying height during operation in said disk drive.

2. A head suspension assembly as in claim 1, wherein said cutout and said finger are horseshoe shaped.

3. A head suspension assembly as in claim 1, wherein each of said slots have said first side defining a shape substantially similar to the shape of an adjacent portion of the perimeter of said flexure and said second side of each of said slots defining a path substantially parallel to a side of said cutout.

4. A head suspension assembly as in claim 1, including apertured ears at the front end of said cutout for facilitating the formation of a bend of the front end of said flexure.

5. A head suspension assembly as in claim 1, including a tooling hole having a reference center point for positioning said slots within said flexure.

6. A head suspension assembly as in claim 5, wherein the front ends of said slots are located about ⅔ of the distance from said reference center point to said front end of said flexure and the rear ends of said slots are located about ⅓ of the distance from said reference center point to said front end of said flexure.

7. A head suspension assembly as in claim 1, wherein said finger is formed with a load dimple for providing gimbaling of said slider.

8. A magnetic head suspension assembly as in claim 1, wherein each of said slots comprises a rectangular section facing towards said rear end of said flexure and a substantially triangular section facing towards said front end of said flexure.

9. A magnetic head suspension assembly as in claim 8, wherein said middle portion of said flexure is about 0.025 inch long, said middle portion is about 0.080 inch wide, said front end is about 0.063 inch wide and said rear end is about 0.060 inch wide.

* * * * *